Oct. 15, 1957  E. SCHMIDT  2,809,517

DYNAMOMETER

Filed July 31, 1956

INVENTOR:
Ernst Schmidt
By Michael S. Striker

United States Patent Office 2,809,517
Patented Oct. 15, 1957

2,809,517

DYNAMOMETER

Ernst Schmidt, Basel, Switzerland

Application July 31, 1956, Serial No. 601,156

Claims priority, application Switzerland August 29, 1955

4 Claims. (Cl. 73—141)

The present invention relates to a dynamometer for measuring tractive and/or compressive forces, which is characterised in that it comprises a stem of elastic material adapted to be loaded in an axial direction by the force to be measured. Engaging with the stem at two points axially spaced apart by a predetermined measuring section, with the interposition of a compensating lever system, is a system of transmission members the distal end of which acts on a measurement instrument in such manner that each change of length of the measuring section resulting from a variation of the force to be measured produces a deflection of the system of transmission members, which deflection is proportional to the said change of length and is automatically transmitted to the measuring instrument. The compensating lever system is so designed and arranged that the deflections transmitted thereby to the system of transmission members corresponds to the mean values resulting with a balanced transmission of force even when the stress is unevenly distributed over the cross-section of the stem.

Such a dynamometer is distinguished by relatively high accuracy and robust construction and is suitable for measuring large and extremely large forces such as occur, for example in cables or reinforcing rods of pre-stressed concrete and in hoisting appliances and material-testing machines. It is also readily possible to design the stem directly as a component part of the apparatus or machine to which the dynamometer is to be attached. Thus, for example, in the case of presses the stem may be disposed between the press housing and the abutment therefor instead of the usual sleeve, while in the case of hydraulic presses the stem may be designed with a central bore for the passage of the piston rod of the press. Such a central bore in the stem is also advantageous for applying tractive forces to be measured to the stem in the form of compressive forces, the traction members whose tractive force is to be measured being passed through the stem and being caused to bear at the opposite end against the end of the stem by means of a cross-member or the like.

As transmission members, levers may with advantage be employed either separately or in juxtaposed or sequential arrangement. Other members usually employed for transmission, such as toothed-wheel gearings, toothed racks or chain or steel-belt drives, may be employed. Part of the transmission system, preferably the greater part, may be disposed within the measuring instrument. However, it is desirable to provide at least one transmission stage in the form of a lever system directly connected to the compensating lever system in order that the compensating lever system may at the same time perform a part of the transmission without any additional source of inaccuracy.

A constructional example of the dynamometer according to the invention is illustrated in the accompanying drawings, in which.

The dynamometer comprises a stem 2 in the form of a cylindrical tube and having a central bore 1, the two ends thereof each being provided with a flange 3, 4. The central hollow cylindrical portion is to be regarded as a measuring section $a$ of the dynamometer, the said section thus being bounded at each end by the flanges 3 and 4. The stem consists of an elastic material, for example of high grade steel.

Figure 2:
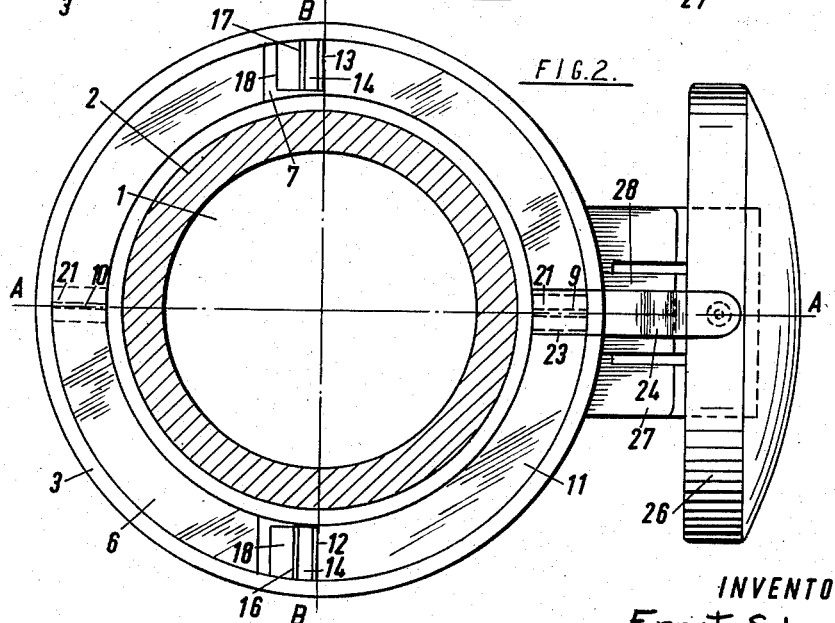
Figure 2 is a cross-section on the line II—II of Figure 1.

Between the flanges 3, 4 the stem is encircled with clearance by a ring of rectangular cross-section formed of two parts 5, 6, which ring lies transversely in relation to the axis of the stem. The ring portion 5 is plane and somewhat longer than a half-ring, while the ends of the ring portion 6 are offset from the ends of the ring portion 5, the stepped portion 7 overlapping the end portions of the ring portion 5 being rigidly connected thereby by means of cap screws 8. The flange 3 is connected to the ring 5, 6 by spring blades 9, 10 engaging with two diametrically opposite points of the flange and of the ring, which lie in a common radial-axial plane A—A (Figure 2). The said plane, which extends through the centre plane of the spring blades 9, 10 is at the same time the common centre plane of symmetry of the ring portions 5, 6.

Disposed between the ring 5, 6 and the flange 4 is a transmission lever provided with a plane half-ring 11. The latter partially engages around the hollow cylindrical portion of the stem 2 in the manner of a fork and is disposed transversely in relation to the axis of the stem, that is to say, parallel to the ring portion 5, and is axially spaced therefrom. The ends of the said half-ring are each connected by a spring blade 12, 13 to the flange 4. The said spring blades 12, 13 are disposed diametrically opposite one another, their common centre plane B—B extending through the axis of the stem and being at a right-angle to the plane A—A.

Figure 1:
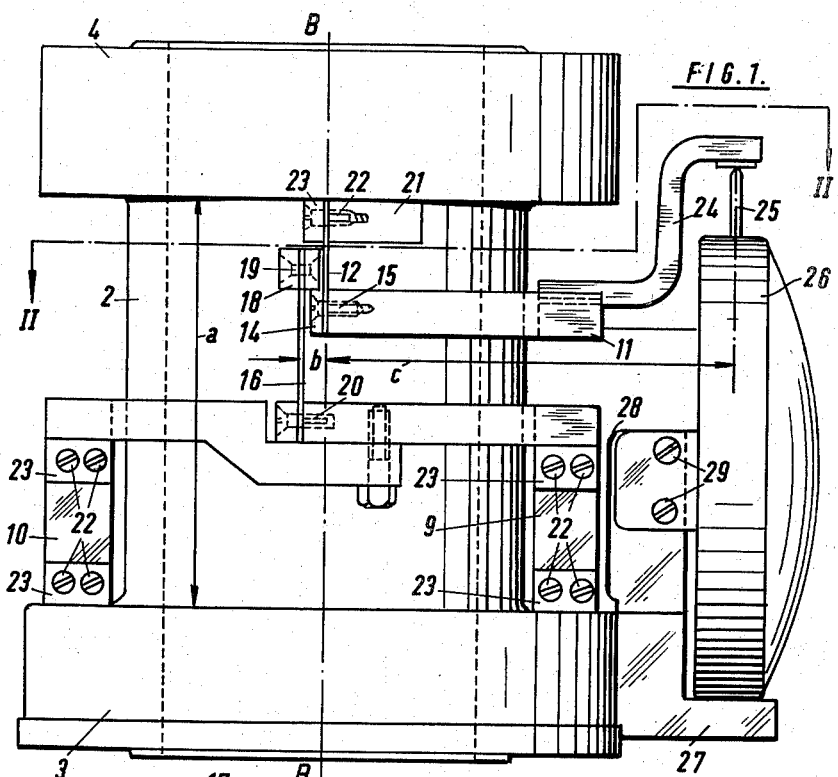
Figure 1 is an elevation.

The spring blades 12, 13 engage with their respective ends with the ends of the lever portion 11 and are each rigidly secured to the latter by a screw 15 with the interposition of a distance piece 14. The other ends of the bent-over distance pieces 14 are connected to the ends of the ring portion 5 by means of spring straps 16, 17 parallel to the spring blades 12, 13 with the aid of cover plates 18 and rivets 19 and screws 20 respectively. The centre planes of the spring blades 16, 17 form a common plane, which is parallel to the plane B—B and at a distance $b$ from the latter (Figure 1).

The spring blades 9, 10, 12, 13 are secured to the flanges 3, 4 and to the ring portions 5, 6 by projections 21 secured to the flanges and ring portions, for example by welding, and by plates 23 connected to the said projections 21 by screws 22, whereby the leaf springs are rigidly clamped together.

The transmission lever further comprises a part 24 bent in zig-zag form and secured to the part 11, for example by welding, the free end of the said part 24 bearing against the point of an actuating needle 25 of a measuring instrument 26, which measuring instrument is supported by means of a bracket 27. The bracket 27 is secured to the flange 3, for example by welding, and is provided with a central holder 28 to which the measuring instrument 26 is removably secured by means of screws 29. The axis of the needle 25 and the centre plane of symmetry of the transmission lever parts 11, 24 lie in the plane A—A.

To use the dynamometer, it is so positioned in the path of transmission of the force that the stem 2 is compressed in the direction of its axis by the force to be measured. When the force to be measured is a tractive force, this force can readily be converted into a compressive force with the aid of a traction member, on which the tractive force to be measured acts, the said traction member extending through the bore 1 in the stem 2 and being provided at its free end with a cross-member which is arranged to bear against the free end of the stem 2, while the other end of the stem bears against an abutment.

The force to be measured produces a corresponding elastic shortening of the stem 2. The change in the length of the measuring section $a$ is thus transmitted through the spring blades, the ring 5, 6 and the transmission lever to the needle 25 of the measuring instrument 26. The said measuring instrument is provided with a scale, preferably calibrated in kilogrammes, with which a pointer is arranged to co-operate. The scale is adjustably arranged in the usual manner, so that the zero position of the pointer can be adjusted before the loading. The spring blades 9, 10, 12, 13, 16, 17 have maximum flexibility in the transverse direction, while having sufficient buckling strength for the setting forces concerned, and then accordingly consist of relatively thin spring steel laminations, for example ½ mm. thick. These spring blades are therefore suitable for forming links with a transverse axis lying in their plane, while themselves being substantially completely inflexible in their plane. Consequently, the spring blades 12, 13 and 16, 17 form a linkage-like bearing and engagement means with respect to the transmission lever, which consists of a shorter lever arm $b$ and a longer lever arm $c$, extending from the adjacent end of the lever arm $b$ to the axis of the needle 25, which is disposed parallel to the rigid axis. The ratio $c:b$ thus constitutes the transmission ratio of the transmission lever.

Since in addition the blades 9 and 10, which by reason of their flexibility, permit a turning movement of the ring 5, 6 with respect to the flange 3 about an axis transverse in relation to the axis of the stem in the plane A—A, the whole arrangement between the flanges 3 and 4 forms a compensating lever system which is designed in the manner of a universal joint with the ring 5, 6 disposed transversely in relation to the axis of the stem and surrounding the latter, the ring being connected to the stem on the one hand at the flange 3 and on the other hand at the other flange with the interposition of a shorter arm $b$ of the transmission lever. Consequently, any alteration in the length of the measuring section $a$ due to the action of the force to be measured will result in a deflection of the transmission lever, which deflection is automatically transmitted to the measuring instrument 26, the compensating lever system being so designed and arranged that the deflections transmitted thereby to the transmission lever correspond to the mean values arising with central transmission of the force even in the case of stresses distributed unevenly over the cross-section of the stem 2. The use of spring blades instead of single-axis joints has the advantage that all play in the joints and all friction between the parts thereof are avoided. Consequently, the accuracy of the measurement is thereby increased.

The measuring instrument can be made sufficiently robust for normal operation and can nevertheless be readily dismantled, if necessary, for transport or when not in use, and subsequently reassembled. It is advantageous to mount the dynamometer in a housing which covers all the parts except the ends of the stem, but does not interfere with the very small change of length of the stem which is required during practical use. The housing may be provided with a panel, for example of transparent plastic, through which the measuring instrument can be read. The housing may be provided with a handle for carrying the dynamometer.

That which is claimed is:

1. A dynamometer for measuring tractive and compressive forces which comprises a stem of elastic material, a ring peripherally surrounding the said stem, a two-armed transmission lever, the said ring being connected in the manner of a universal joint on the one hand to a point of the said stem and on the other hand, through the shorter lever arm of the said transmission lever, to a second point of the said stem axially spaced from the first point, the longer arm of the said transmission lever so acting on a measuring instrument that each change of length of the said stem between the point of engagement of the said ring and the point of engagement of the said transmission lever is transmitted to the said measuring instrument with a constant transmission ratio.

2. A dynamometer for measuring tractive and compressive forces which comprises a stem of elastic material, a ring peripherally surrounding the said stem, the said ring being connected on one side to the said stem by a paid of spring blades, which engage at two diametrically opposite points with the said stem and the said ring and lie in a first common radial-axial plane, a two-armed transmission lever, the shorter arm of which is connected at one end to the said ring and at the other end to the said stem by a second pair of spring blades at a point axially spaced from the two first-mentioned stem connecting points, the said second pair of blades consisting of two spring blades engaging with the said stem at two diametrically opposite points, the latter two spring blades lying in a common second radial-axial plane which extends at a right-angle to the first-mentioned plane, the longer arm of the said transmission lever so acting on a measuring instrument that each change of length of the said stem between the point of engagement of the said first pair of blades and the point of engagement of the said second pair of blades with the said stem being transmitted to the said measuring instrument with a constant transmission ratio.

3. A dynamometer according to claim 2, wherein said ring is connected to the said shorter transmission lever arm by two spring blades lying in a common plane parallel to the plane of the first pair of spring blades connecting the said transmission lever to the said stem.

4. A dynamometer according to claim 2, wherein the said stem is bounded at each end by a flange-like head and the two spring blades of the first pair of spring blades being rigidly clamped in the shoulder of one head and the two spring blades of the said second pair of spring blades being rigidly clamped in the shoulder of the second head.

References Cited in the file of this patent

UNITED STATES PATENTS 2,099,662     Slonneger             Nov. 16, 1937
2,761,670     Fouretier              Sept. 4, 1956